May 20, 1952  E. T. RIDGWAY  2,597,841
FRAME CONSTRUCTION AROUND OPENINGS OF TRAILERS
AND OTHER VEHICLES AND STRUCTURES
Filed April 9, 1949
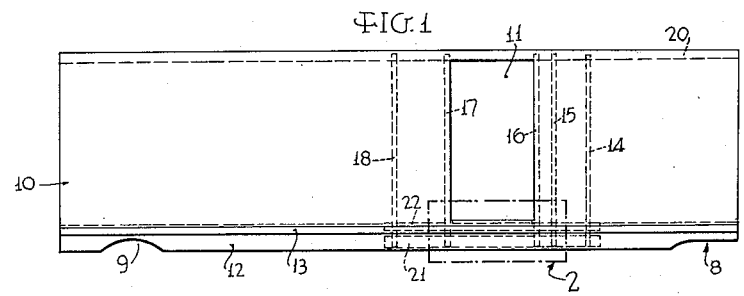
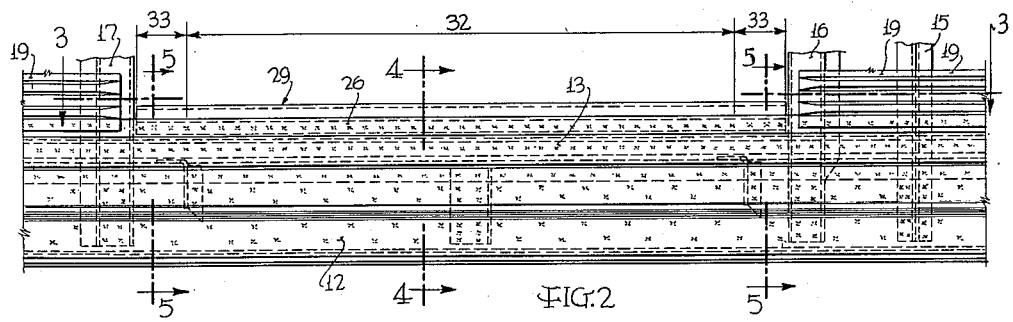
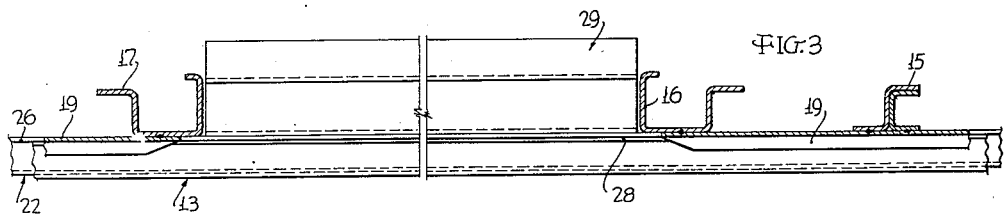
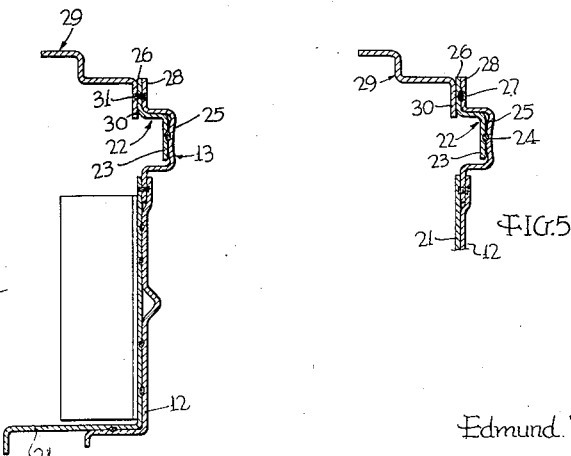
INVENTOR.
Edmund T. Ridgway
BY
Maurice A. Crews
ATTORNEY Patented May 20, 1952

2,597,841

UNITED STATES PATENT OFFICE 2,597,841

FRAME CONSTRUCTION AROUND OPENINGS OF TRAILERS AND OTHER VEHICLES AND STRUCTURES

Edmund T. Ridgway, Oaklyn, N. J., assignor to The Budd Company, Philadelphia, Pa., a corporation of Pennsylvania Application April 9, 1949, Serial No. 86,564

8 Claims. (Cl. 296—29)

1

The invention relates to the construction of certain parts of the framework surrounding an opening in a load supporting and stress transmitting wall, and especially to a side wall construction of vehicle bodies such as trailer bodies, provided with an opening between its longitudinally spaced supporting regions.

The main object of the invention is the elimination of a serious structural weakness encountered in self-supporting sheet metal trailers having a large load opening in one or each side wall between the front and rear supports. Subordinate objects of the invention are the achievement of the main object with a minimum of expense, labor, material and structural changes in existing constructions.

The structural weakness to be overcome by the invention consists therein that trailers of the above-indicated type, in which the side walls are main load and stress transmitting elements, develop cracks at the lower corners of the side wall opening. Such cracks dangerously weaken the structure so that they require immediate attention, and they involve a major, expensive repair.

The invention overcomes the tendency to develop cracks by the mere omission of a number of spot welds or other connecting means between a threshold member and the lower side sill at and adjoining the lower corners of the wall opening.

The broad aspects of the invention as well as specific details thereof will be more easily and completely understood from the embodiment of the invention which is illustrated in the attached drawing and now to be described.

In the drawing:

Figure 1 is a diagrammatic small-scale side elevation of a self-supporting trailer body;

Figure 2 is a fragmentary side elevation, on a larger scale, of the region of the trailer surrounded in Figure 1 by the dot-and-dash line 2;

Figure 3 is a fragmentary section along line 3—3 of Figure 2, on a still larger scale; and Figures 4 and 5 are vertical sections along lines 4—4 and 5—5, respectively, of Figure 2 and on about the same scale as Figure 3.

The illustrated trailer is of a well known spot welded sheet metal construction in which floor, upright walls and roof are main load supporting and stress transmitting elements and, together, form a self-supporting, generally prismatic body to be carried, without the interposition of a separate chassis frame, in the front and rear regions at 8 and 9, respectively, by a tractor and by road wheels (not shown).

The side wall 10 visible in the drawing, or each side wall of the body, is provided with a loading opening 11 between the end supporting regions 8 and 9. The customary door for closing the

2 opening is not shown. Side wall 10 has a bottom rail or sill member 12, a rub rail 13, longitudinally spaced upright posts of which only the posts 14, 15, 16, 17 and 18 at and near the opening 11 are shown, longitudinally corrugated sheathing 19, and a header or top chord 20. Sheathing 19 is structurally secured to the posts, the rub rail 13 and to the header 20, the latter connecting the side wall with the roof.

Side rail 12 and rub rail 13 are reinforced in and adjacent the region of the opening 11 by an angle-section rail 21 and a Z-section rail 22 respectively. The reinforcing means 21 and 22 extend across and are structurally connected with the lower ends of the posts 14 to 18, that is, with the posts flanking and near to the opening 11. Rail 22 has its downwardly extending arm 23 over its entire length structurally connected by a row of welds 24 to the bottom wall or web 25 and its upwardly extending arm 26 by a row of welds 27 to the upper flange 28 of the inwardly facing channel-section rail 13. Other spot weld connections between the parts described so far are indicated by small x's in the drawing but require no description because they may be of customary arrangement and have no direct bearing on the features constituting the invention.

The lower sill or chord structure comprising the members 12, 13, 21 and 22 is further reinforced in the region of the door opening by an angle-, Z- or double-angle-section threshold member 29 which by its downwardly extending flange or arm 30 overlaps the inside of arm 26. In the customary construction, this threshold member 29 is structurally secured over its entire length to the arms 26 and 28 by spot welds 31, as shown in Figure 4.

In accordance with the invention, the connection of member 29 to the side sill structure by the welds 31 is, however, restricted to a zone 32, Figure 2, which is spaced at both ends a distance 33 from the ends of the member 29. In the end regions 33, the member 29 is left without stress transmitting connection, and the welds 27 connect merely the flanges 26 and 28, as illustrated in Figure 5.

The length of the regions 33, which in regard to the member 29 may be called no-weld regions, depends on several factors, such as the width of the door opening, the magnitude of the stresses to be transmitted, the strength of the elements adjoining the door opening, and so on. In a trailer of the otherwise conventional, illustrated construction made of high tensile austenitic stainless seel, manufactured by electric spot welding, having a door opening of about 40" width, effective no-weld regions 33 of about 3¼" each were found to give the desired result. However, the length of the regions or zones 33 may be varied as long as the desired reinforcing function of the member 29 is maintained while the connection of member 29 is effectively kept away from the corners of the opening.

The member 29 is preferably slightly shorter than the distance between the posts 16 and 17 flanking the opening 11, so that a space of 1/16" may be left at each end. It is important that member 29 is not, or at least not structurally, connected to the posts.

In assembling the illustrated construction, arm 23 of member 22 is connected throughout its length by the welds 27 to wall 25 of rub rail 13, and arm 26 is secured throughout the same length except for the region 32 to flange 28 by the welds 27. After this initial connection, member 29 is added and the welds 31 which extend through and connect all three flanges 26, 28 and 30, as shown in Figure 4, are made in the region 32 while leaving flange 30 in the end regions 33 of the opening unattached.

The mere omission of the weld connections of the threshold member 29 in the regions 33 has the surprising result of avoiding the occurrence of cracks at the lower corners of the door opening. Such cracks, as mentioned hereinbefore, appear in the former constructions after a certain time period of use of the vehicle, such as after a year, and involve a major, expensive repair of a trailer which, in the case of stainless steel construction, is supposed to last practically indefinitely. The long life expectancy, next to savings in dead weight, is an important factor enabling the use of such rather expensive material as stainless steel and the selling of bodies made thereof at a correspondingly high price. The purpose of using stainless steel in a vehicle body is, of course, largely defeated if after a relatively short length of time, be it one year, two years or somewhat more, as compared with the otherwise expected, very long life of the structure, a weakness manifests itself which leads to a breakdown or calls for an immediate major repair.

Extensive tryouts of the invention over a sufficiently long period of time give the assurance that the defect of the former construction is now actually and permanently overcome.

A tentative explanation of the great results achieved by merely omitting a few weld connections is that the new construction avoids or at least minimizes stress concentrations which presumably lead to the cracks in the prior construction.

The new inventive principle is not restricted to the specific embodiment illustrated and described but is applicable to other structures where frame members extend from the outside or the inside to and end at a corner of an opening and where, consequently, the formation of cracks is encountered or expected. The invention is, for instance, applicable also to constructions using other connecting means, e. g., rivets, instead of spot welds.

What is claimed is:

1. In a vehicle body, a stress transmitting wall structure surrounding a multi-corner opening, an elongated member arranged in line with one of the margins and adjoining one of the corners of the opening, and structural connections between said wall structure and said member distributed over the length of the latter to the permanent exclusion of a substantial part of said length at and adjacent said corner, said part being, in case of a plurality of about equally spaced individual connections, several times the spacing between such connections.

2. In a vehicle body, a stress transmitting wall structure surrounding a four-sided opening, an elongated reinforcement arranged along one of the margins and between two of the corners of the opening, and a plurality of individual structural connections, such as spot welds, between said wall structure and its reinforcement distributed with about equal spacing over the greater part of the length of said reinforcement and margin but permanently left free of such connection along short parts of said length at and adjacent said corners, the length of said parts being at least several times the spacing between adjacent ones of said individual connections.

3. In a vehicle body having a stress transmitting wall structure surrounding an opening; having frame members extending along margins and structurally interconnected at corners of the opening, at least one of said members extending beyond said corners; and having a reinforcing member coextensive with a part of a frame member which extends beyond a corner, said reinforcing member ending near one of the corners of the opening and being connected with said first-named frame member over a large part of its length to the permanent exclusion of a region of several inches adjacent said one corner.

4. In a vehicle body of generally elongated prismatic configuration; a stress transmitting side wall provided with an opening between end supporting points of the body and with a lower chord structure; vertical posts, of which two flank said opening, structurally connected with said chord structure; a sheet metal shear panel structurally connected with said chord structure and said posts; a threshold member extending along the lower margin of said opening and being structurally connected with said chord structure over the greater part of the distance between but to the permanent exclusion of regions of substantial length adjoining the lower corners of the opening.

5. In a self-supporting body for highway freight vehicles: a stress transmitting side wall provided with a loading opening between end supporting regions of the body; a chord structure along the lower margin of and coextensive with said side wall, said structure comprising an upright web and a rub rail of inwardly facing channel-section along the upper margin of said web, said section having an upper and a lower marginal flange; upright, longitudinally spaced posts structurally connected to said web and said rub rail; a sheet metal shear panel structurally connected with said rub rail and said posts and constituting the panelling of the wall; longitudinally extending reinforcements extending through and in both directions beyond said door opening and being structurally connected with said web and rub rail and with the lower ends of some of said posts on both sides of said opening, said reinforcements ending short of the ends of the side wall; and a threshold member inserted between two of said posts which flank said opening, said threshold member being secured over the larger part of its length to the upper flange of said rub rail and its reinforcement but being free of such connections in regions at and adjacent the lower corners of the opening.

6. In a self-supporting body of generally elongated prismatic shape, a side wall comprising a lower chord structure, longitudinally spaced upright posts and a shear panel, all three structurally connected with each other, said chord structure and two of said posts defining the vertical sides and the lower side of an opening arranged between end supporting regions of the body, a longitudinally arranged elongated reinforcing structure structurally connected with said chord structure in the region of the door opening and in regions extending longitudinally beyond said opening, said reinforcing structure ending short of the ends of said wall; and a reinforcing threshold member inserted between the posts defining vertical sides of the opening and structurally connected throughout the greater part of its length to the upper margin of said chord structure and its reinforcement but left free of such connection in short regions adjacent such posts.

7. In a self-supporting body of generally elongated prismatic shape, a side wall comprising a lower chord structure, longitudinally spaced upright posts and a shear panel, all three structurally connected with each other, said chord structure and two of said posts defining the side and bottom margins of an opening arranged between end supporting regions of the body, elongated reinforcing means structurally extending along the lower margin of and longitudinally beyond said opening but ending short of the ends of said wall; said reinforcing means being connected throughout its length to said chord structure and on each side of said opening to at least two of said posts at and adjacent said opening; and a reinforcing threshold member inserted between the posts at the side margins of the opening and structurally connected throughout the greater part of its length to the upper margin of said chord structure and its reinforcing means but left free of such connection in short regions adjacent said side margins.

8. In a vehicle body of generally elongated prismatic configuration, a stress transmitting side wall provided with an opening between supporting regions of the body, said side wall having a lower chord structure, vertical posts of which two flank said opening and a sheet metal shear panel structurally connected with said chord structure and said posts, said chord structure having an upright web along its upper margin, a threshhold member extending along the lower margin of the door opening and having an upright arm structurally overlappingly connected to said web of said chord structure over the greater part of the lower margin of the door opening but to the exclusion of regions adjoining the lower corners of the opening.

EDMUND T. RIDGWAY.

REFERENCES CITED

The following references are of record in the file of this patent:

UNITED STATES PATENTS

| Number | Name | Date |
|---|---|---|
| 1,673,786 | Warhus | June 12, 1928 |
| 2,172,571 | Theriault | Sept. 12, 1939 |
| 2,382,584 | Scheyer | Aug. 14, 1945 |
| 2,495,782 | Smith | Jan. 31, 1950 |

OTHER REFERENCES

"Welding Instructions," Third edition, 1944, U. S. Maritime Commission.

"Typhonite Eldorado," advertisement of Joseph Dixon Crucible Co. on page 129 of "Engineering News-Record," October 26, 1939.